(12) United States Patent
Channabasavaiah et al.

(10) Patent No.: US 8,402,092 B2
(45) Date of Patent: Mar. 19, 2013

(54) SELECTING A SERVICE ORIENTED ARCHITECTURE SHARED SERVICE

(75) Inventors: Kishore Channabasavaiah, Palatine, IL (US); Stephen C. Kendrick, Fairfax, VA (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 12/391,426

(22) Filed: Feb. 24, 2009

(65) Prior Publication Data

US 2010/0217633 A1 Aug. 26, 2010

(51) Int. Cl.
*G06F 15/16* (2006.01)
(52) U.S. Cl. ........................................ 709/205
(58) Field of Classification Search .................. 709/205, 709/220
See application file for complete search history.

(56) References Cited

U.S. PATENT DOCUMENTS

| | | | |
|---|---|---|---|
| 7,584,282 B2 * | 9/2009 | Reeves et al. | 709/226 |
| 2004/0093381 A1 | 5/2004 | Hodges et al. | |
| 2006/0059253 A1 | 3/2006 | Goodman et al. | |
| 2006/0235733 A1 | 10/2006 | Marks | |
| 2007/0022404 A1 | 1/2007 | Zhang et al. | |
| 2008/0028365 A1 * | 1/2008 | Erl | 717/105 |
| 2008/0066048 A1 | 3/2008 | Hafermann et al. | |
| 2008/0077652 A1 | 3/2008 | Grant et al. | |
| 2009/0089078 A1 * | 4/2009 | Bursey | 705/1 |
| 2009/0132708 A1 * | 5/2009 | Hayward | 709/226 |

FOREIGN PATENT DOCUMENTS

| | | |
|---|---|---|
| JP | 2006099162 A | 4/2006 |
| WO | 2008011122 A2 | 1/2008 |

* cited by examiner

*Primary Examiner* — Jason Recek
(74) *Attorney, Agent, or Firm* — William E. Schiesser; Ronald A. D'Alessandro; Keohane & D'Alessandro PLLC

(57) ABSTRACT

An approach that selects a service oriented architecture (SOA) shared service is provided. In one embodiment, there is a service selection tool, including an input component configured to gather service requirements of a SOA shared service project; an identification component configured to identify a set of candidate SOA shared services that meets the service requirements of the SOA shared services project; an analysis component configured to compare the set of candidate SOA shared services to a set of technical and business requirements, and select a set of SOA shared services from the set of candidate SOA shared services for construction based on a comparison of the set of candidate SOA shared services to the set of technical and business requirements.

20 Claims, 7 Drawing Sheets

SELECTING A SERVICE ORIENTED ARCHITECTURE SHARED SERVICE

CROSS-REFERENCE TO RELATED APPLICATION

The present application is related in some aspects to commonly owned and co-pending application entitled "Identification of a Service Oriented Architecture Shared Services Project", which was filed on Nov. 24, 2008, and was assigned application Ser. No. 12/277,280, commonly owned and co-pending application entitled "Evaluating a Service Oriented Architecture Shared Service Project", which was filed on Feb. 19, 2009, and assigned application Ser. No. 12/388,533, commonly owned and co-pending application entitled "Designing a Service Specific Service Oriented Architecture Shared Services Solution", which was filed on (to be provided), and was assigned application serial no. (to be provided), commonly owned and co-pending application entitled "Constructing a Service Oriented Architecture Shared Service", which was filed on (to be provided), and was assigned application serial no. (to be provided), commonly owned and co-pending application entitled "Transitioning to Management of a Service Oriented Architecture Shared Service", which was filed on (to be provided), and was assigned application Ser. No. (to be provided), commonly owned and co-pending application entitled "Management of a Service Oriented Architecture Shared Service", which was filed on (to be provided), and was assigned application serial no. (to be provided), commonly owned and co-pending application entitled "Managing a Service Oriented Architecture (SOA) Shared Services Escalation", which was filed on Feb. 24, 2009, and was assigned application Ser. No. 12/391,362, the entire contents of which are herein incorporated by reference.

FIELD OF THE INVENTION

This invention relates generally to lifecycle management and more specifically to the selection of SOA shared services.

BACKGROUND OF THE INVENTION

In the past, software architectures have attempted to deal with increasing levels of software complexity. As the level of complexity continues to increase, traditional architectures are reaching the limit of their ability to deal with various problems. At the same time, traditional needs of information technology (IT) organizations persist. IT organizations need to respond quickly to new requirements of the business, while continuing to reduce the cost of IT to the business by absorbing and integrating new business partners, new business sets, etc.

Current IT lifecycle processes are configured to managing self-contained and siloed solutions. However, as businesses transition to service oriented architectures (SOA), traditional IT governance methods are inadequate at managing SOA shared services during their entire lifecycle. SOA is not a self-contained and siloed solution; rather it's a decomposition of solutions into a set of shared services. It is these SOA shared services that require a new lifecycle management system, which takes into consideration multiple new processes that are not available or part of existing IT governance systems.

SUMMARY OF THE INVENTION

In one embodiment, there is a method for selecting a service oriented architecture (SOA) shared service. In this embodiment, the method comprises: gathering service requirements of a SOA shared service project; identifying a set of candidate SOA shared services that meets the service requirements of the SOA shared services project; comparing the set of candidate SOA shared services to a set of technical and business requirements; and selecting a set of SOA shared services from the set of candidate SOA shared services for construction based on the comparing.

In a second embodiment, there is a system for selecting a service oriented architecture (SOA) shared service. In this embodiment, the system comprises at least one processing unit, and memory operably associated with the at least one processing unit. A service selection tool is storable in memory and executable by the at least one processing unit. The service selection tool comprises: an input component configured to gather service requirements of a SOA shared service project; an identification component configured to identify a set of candidate SOA shared services that meets the service requirements of the SOA shared services project; an analysis component configured to compare the set of candidate SOA shared services to a set of technical and business requirements, and select a set of SOA shared services from the set of candidate SOA shared services for construction based on a comparison of the set of candidate SOA shared services to the set of technical and business requirements.

In a third embodiment, there is a computer-readable medium storing computer instructions, which when executed, enables a computer system to select a service oriented architecture (SOA) shared service, the computer instructions comprising: gathering service requirements of a SOA shared service project; identifying a set of candidate SOA shared services that meets the service requirements of the SOA shared services project; comparing the set of candidate SOA shared services to a set of technical and business requirements; and selecting a set of SOA shared services from the set of candidate SOA shared services for construction based on the comparing.

In a fourth embodiment, there is a method for deploying a service selection tool for use in a computer system that provides selection of a service oriented architecture (SOA) shared service. In this embodiment, a computer infrastructure is provided and is operable to: gather service requirements of a SOA shared service project; identify a set of candidate SOA shared services that meets the service requirements of the SOA shared services project; compare the set of candidate SOA shared services to a set of technical and business requirements; and select a set of SOA shared services from the set of candidate SOA shared services for construction based on a comparison of the set of candidate SOA shared services to the set of technical and business requirements.

Figure 1:
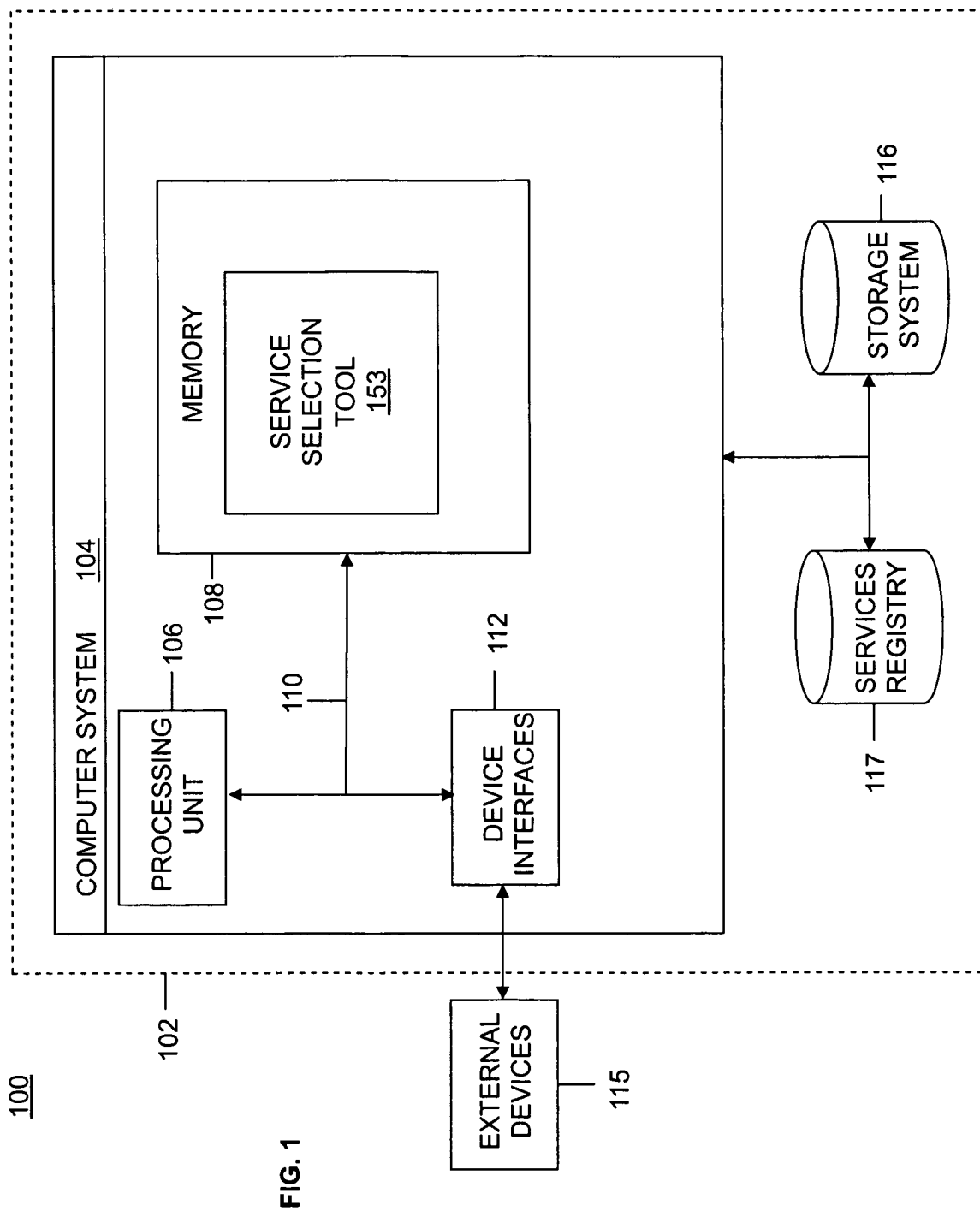
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to selecting a service oriented architecture (SOA) shared service. In these embodiments, a service selection tool provides this capability. Specifically, the service selection tool comprises an input component configured to gather service requirements of a SOA shared service project; an identification component configured to identify a set of candidate SOA shared services that meets the service requirements of the SOA shared services project; an analysis component configured to compare the set of candidate SOA shared services to a set of technical and business requirements, and select a set of SOA shared services from the set of candidate SOA shared services for construction based on a comparison of the set of candidate SOA shared services to the set of technical and business requirements.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for selecting a SOA shared service. It should be understood that any other computers implemented under the present invention may have different components/software, but will perform similar functions. As shown, computer system 104 includes a processing unit 106, memory 108 for storing a service selection tool 153, a bus 110, and device interfaces 112.

Processing unit 106 collects and routes signals representing outputs from external devices 115 (e.g., a keyboard, a pointing device, a display, a graphical user interface, etc.) to service selection tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating service selection tool 153, which is stored in memory 108 and/or storage system 116. While executing computer program code, processing unit 106 can read and/or write data to/from memory 108, storage system 116, and a services registry 117. Services registry 117 stores a plurality of SOA shared services and associated metadata, as well as rules against which the metadata is compared to locate, update, and store SOA shared services. Storage system 116 and services registry 117 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

Figure 2:
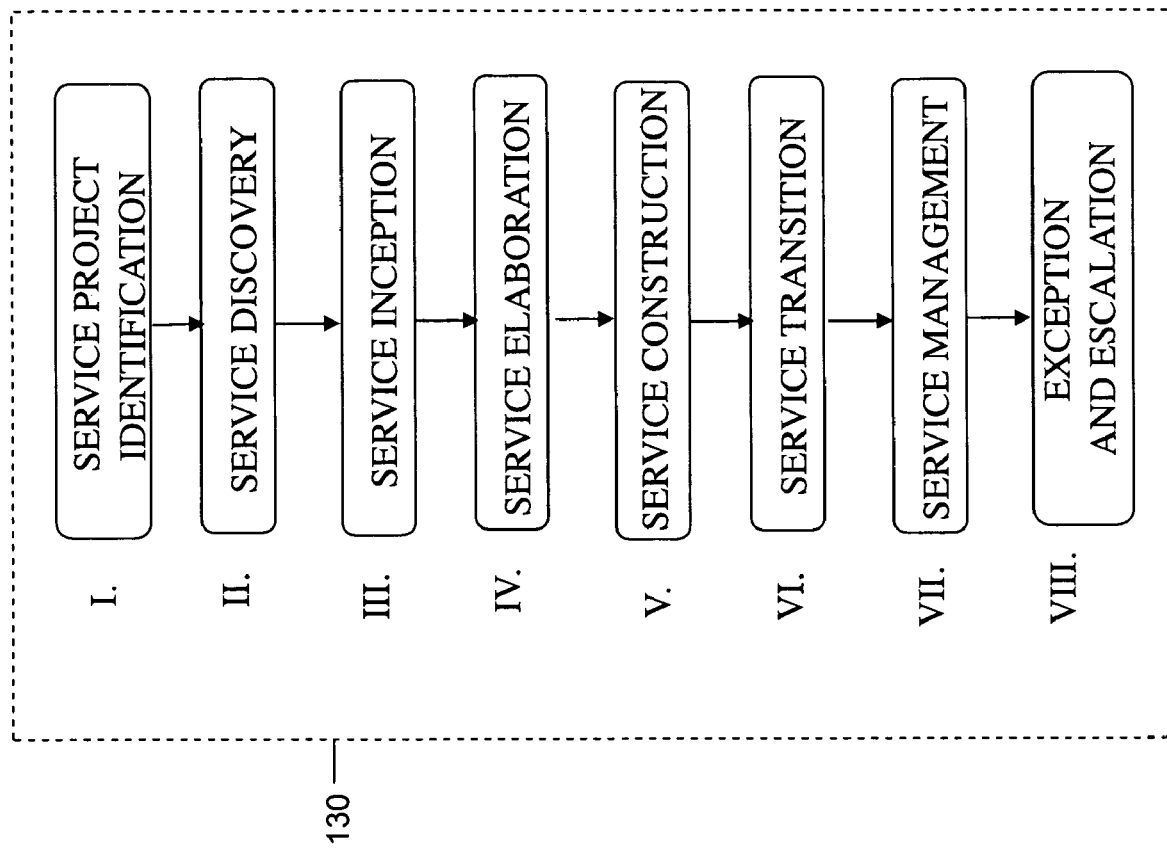
FIG. 2 shows a flow diagram of a SOA services lifecycle management process.

Implementation 100 and service selection tool 153 operate within a broader SOA services lifecycle management process (SLMP) 130, shown in FIG. 2, which identifies, evaluates, implements, constructs, and manages a SOA shared service. SOA SMLP 130 provides guidance for managing the entire lifecycle of a shared service(s) within an enterprise. Specifically, SOA SLMP 130 of the present invention includes new and distinct roles, governance checkpoints, increased collaboration requirements, and new decision control points. SOA SMLP 130 takes an extended view in identifying the various touch-points inside and outside of the organization to plan, build and manage shared services. The initial processes starts with the identification of a business initiative(s) (e.g., a business need) having the potential of being a shared service project candidate. The overall set of processes ends with the rollout of shared services fulfilling the identified business initiative, as well as management across its entire life.

SOA SLMP 130 of the present invention consists of the following distinct processes and associated methodologies:

I. New Service Project Identification—the goal of this phase is to evaluate and identify a SOA shared services opportunity (i.e., a business need), and to determine if the SOA shared services opportunity can be met through the use of SOA shared services.

II. Service Discovery—the goal of this phase is to complete the Discovery phase for a project that has been identified as a potential SOA services candidate project.

III. Service Inception—the goal of this phase is to gather high-level service requirements and select the SOA shared services that will be developed as part of the potential SOA shared services candidate project.

IV. Service Elaboration—the goal of this phase is to further define the high level requirements from the Inception phase into detailed requirements to complete the service solution design and prepare for the build phase.

V. Service Construction—the goal of this phase is to develop the integration components and integrate the SOA shared services components per the design guidelines while meeting/exceeding the necessary quality requirements so that the services can be deployed for general use.

VI. Service Transition—the goal of this phase is to transition the SOA shared services developed in the Construction phase to the operations group that will be responsible for ongoing SOA shared service maintenance.

VII. Service Management—the goal of this phase is to manage the SOA shared services once they have been transitioned to the operations team that will be responsible for ongoing SOA shared service maintenance.

VIII. Exception and Escalation—the goal of this phase is resolve issues that occur during the SOA services lifecycle process in an expedient manner.

Each of the above processes is a complete methodology that can be implemented independently since they define key stakeholders, affected processes, and touch-points throughout the organization. It will be appreciated that each of the above listed SOA processes are non-limiting examples of the functionality and operation of possible implementations of systems, methods and computer program products according to various embodiments of the present invention. In this regard, each process (I-VIII) may represent a module, segment, or portion of code, which comprises one or more executable instructions for implementing the specified logical function(s) of SOA SLMP 130, as shown in FIG. 2. It should also be noted that, in some alternative implementations, the functions noted in SOA SLMP 130 may occur out of the order listed above in processes I-VIII. For example, two processes shown in FIG. 2 in succession may, in fact, be executed substantially concurrently. It should also be noted that, in another alternative embodiment, additional or fewer process steps may be included in SOA SLMP 130. Further, each process of the flowchart of FIG. 2 can be implemented by special purpose hardware-based systems that perform the specified functions or acts, or combinations of special purpose hardware and computer instructions.

Figure 3:
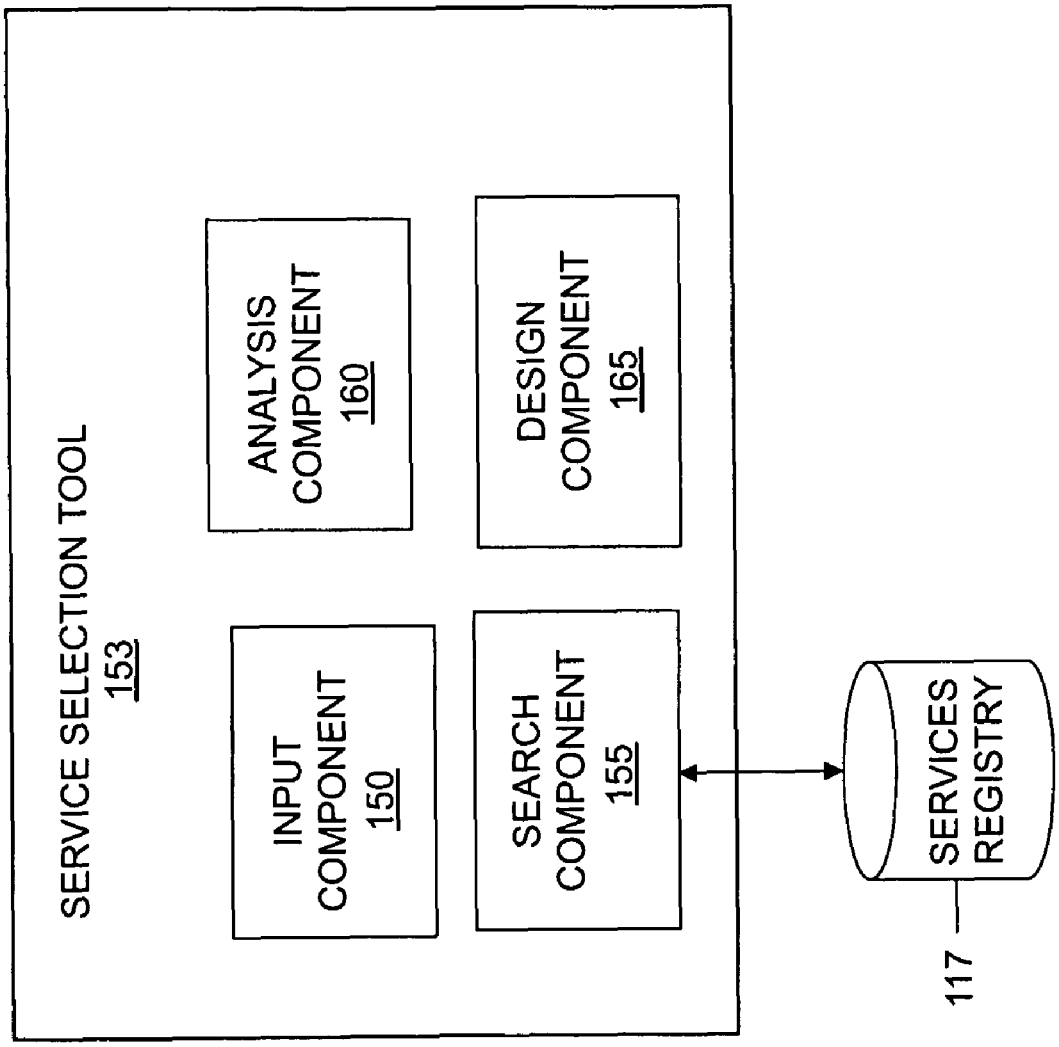
FIG. 3 shows a service selection tool that operates in the environment shown in FIG. 1.
Figure 4:
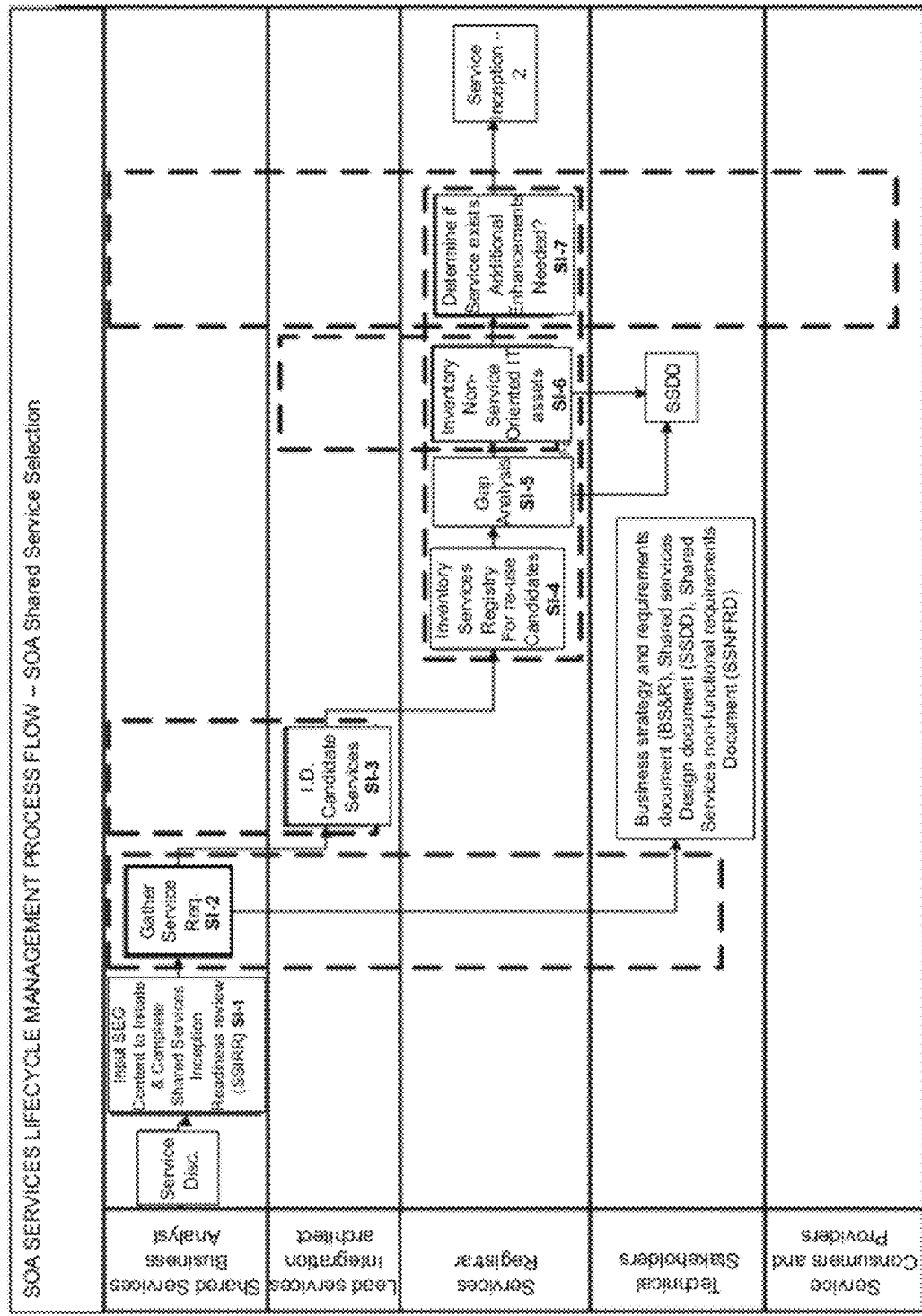
FIG. 4 shows a flow diagram of a SOA services lifecycle management process for selecting a SOA shared service.

FIG. 3 shows a more detailed view of service selection tool 153, which searches for and selects a set of SOA shared services. As shown, service selection tool 153 comprises an input component 150 configured to gather service requirements of a SOA shared service project, which is developed to address a SOA shared service opportunity (i.e., a business need that may benefit from SOA shared services). In one embodiment, service requirement input is received from an SOA enablement group for initiation of the service inception phase (FIG. 2), wherein the input comprises virtually any information (resources, schedules, etc.) necessary to begin this phase. It will be appreciated that the SOA enablement group described herein may represent a committee or group of individuals within an organization, or may represent a module, segment, or portion of code, which comprises one or more executable instructions for implementing the selection of the SOA shared service(s).

Next, service selection tool 153 begins the process of locating services that may potentially meet the business need(s) of the SOA shared services project. To accomplish this, service selection tool 153 comprises an identification component 155 configured to identify a set of candidate SOA shared services that meets the requirements of the SOA shared services project. In one embodiment, identification component 155 is configured to search within services registry 117 for existing SOA shared services that can be re-used, as will be described in further detail below. If one or more candidate SOA shared services are located, an analysis component 160 compares the candidate SOA shared services to a set of technical and business requirements. The technical scope and architectural feasibility of the candidate SOA shared services and the SOA shared services project need to be evaluated for alignment. For example, a high-level business strategy/vision for the SOA shared services project is evaluated against the candidate SOA shared services for alignment. If alignment exists, analysis component 160 is configured to select a set of SOA shared services from the set of candidate SOA shared services for construction.

Referring now to FIGS. 4-7, a SOA services lifecycle management process (SLMP) flow 170 for selecting a SOA shared service will be described in further detail. SOA SLMP flow 170 begins by receiving input at service inception-1 (SI-1) to initiate the SOA shared services project and evaluate its readiness. If the SOA shared services project is considered ready, the service requirements of the SOA shared services project are gathered at SI-2. The service requirements may be entered into an updatable rubric/metric for future use. In the embodiment shown, the service requirements are entered into a number of documents, such as, a Business Strategy & Requirements Document (BS&R), a Shared Services Design Document (SSDD), and a Shared Services Non-Functional Requirements Document (SSNFRD).

Next, based on the service requirements, a set of candidate shared services is identified at SI-3. There may be existing services with services registry 117 that can be leveraged and applied to the SOA shared services project. In one embodiment, at SI-4, identification component 155 (FIG. 3) searches within registry component 117 for possible SOA shared service re-use candidates. At SI-5, analysis is performed on any potential re-use candidates located within services registry 117 to determine which candidate service most effectively meets the business need(s). Next, at SI-6, non-shared service IT assets are identified for possible synergies with the proposed SOA shared service(s). It is then determined whether a SOA shared service exists that will potentially fit the SOA shared services project, and whether any modifications or enhancements to the SOA shared service are needed (SI-7).

Figure 5:
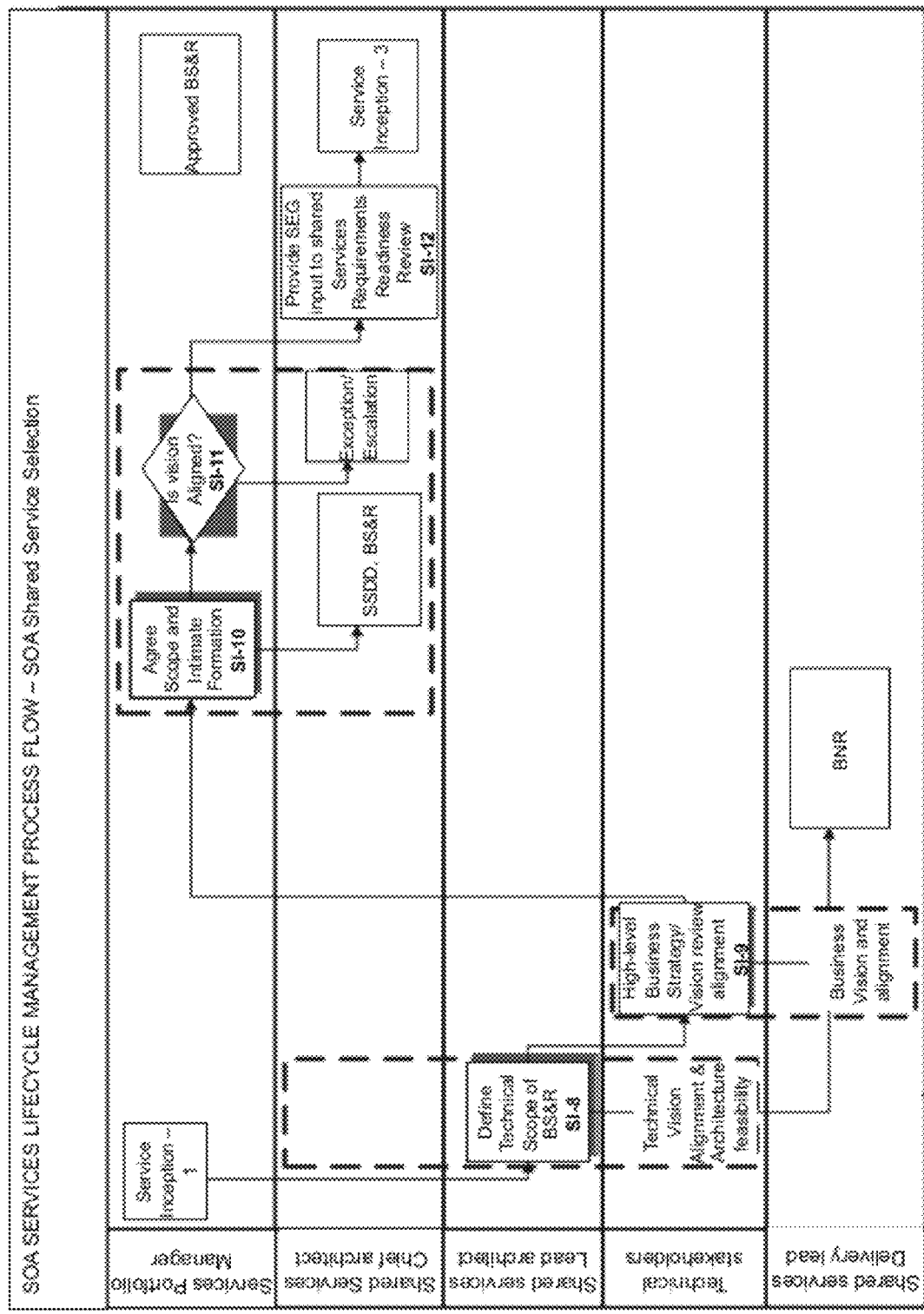
FIG. 5 shows a flow diagram of a SOA services lifecycle management process for selecting a SOA shared service.

Next, as shown in FIG. 5, SOA SLMP flow 170 proceeds to SI-8, where the technical requirements of the SOA shared services project that were entered into BS&R are compared against the SOA shared service to ensure vision and architectural feasibility. At SI-9, the business requirements are compared against the SOA shared service for alignment. If the technical and business requirements agree in scope with the SOA shared service, formation is initiated at SI-10. This step aligns business process analysis validation, and identifies likely development approaches according to decision and applicable standards, (e.g. mainframe, distributed, client executables). Further, potential service reuse is evaluated, and the project purpose is also evaluated to identify what candidate SOA shared services are available (e.g., corporate-wide). At SI-11, a decision is made as to whether the vision between the SOA shared service and the SOA shared service project is aligned. This step determines if the planned SOA shared service is aligned with the technical and business visions. If the SOA shared service is not aligned, the service must be re-evaluated to determine if the planned SOA shared service has enough business benefit to still be developed. However, if the planned SOA shared service is aligned with both the technical and business visions, the process continues to SI-12, where SOA Enablement Group receives input, for example, at a Shared Services Requirements Readiness Review (SSRRR).

Figure 6:
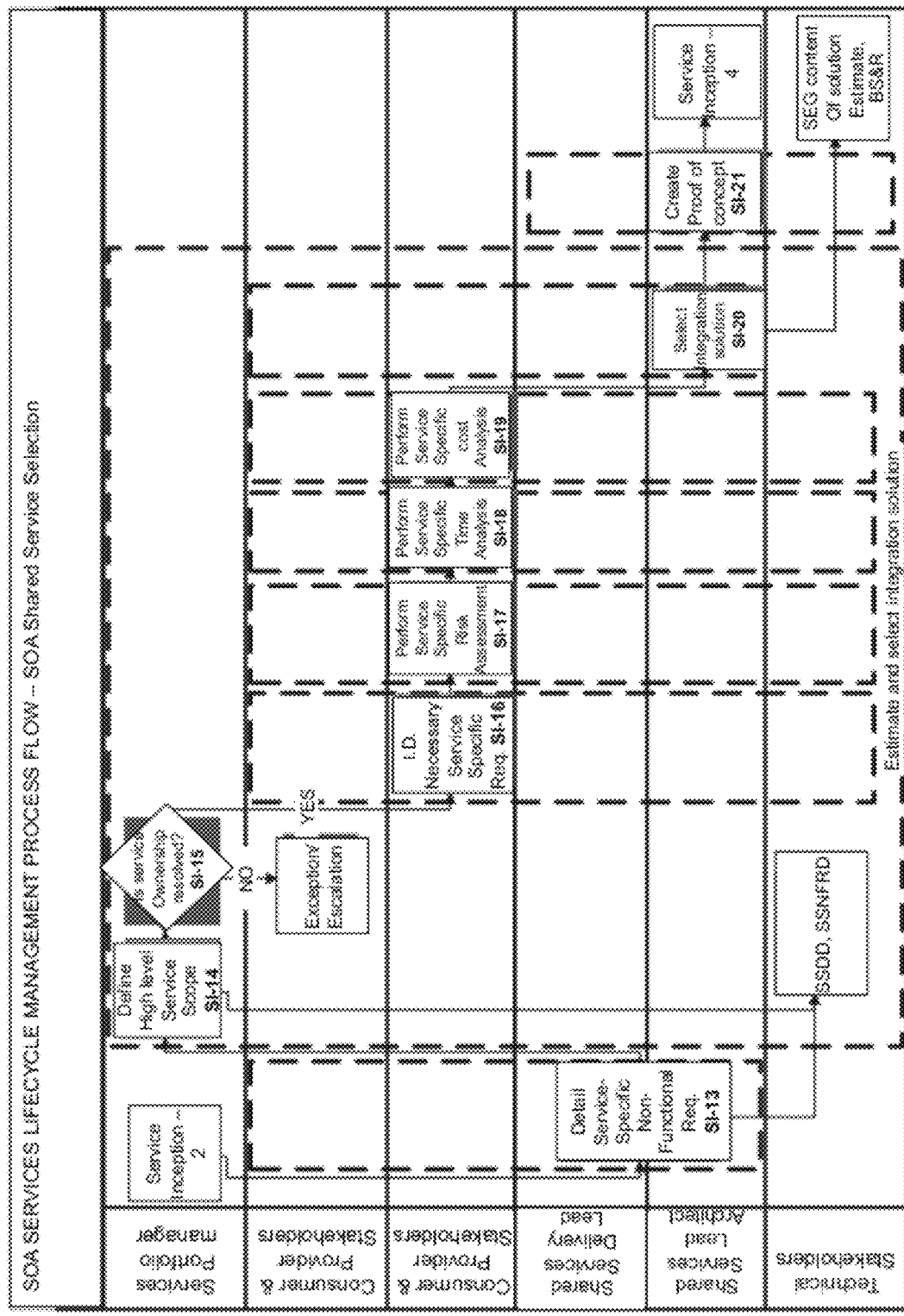
FIG. 6 shows a flow diagram of a SOA services lifecycle management process for selecting a SOA shared service.

As shown in FIG. 6, SOA SLMP flow 170 continues to SI-13, where service-specific, non-functional requirements are detailed. A non-limiting list of non-functional requirements includes security, performance, quality of service, availability, scalability, cost of ownership, service management attributes, etc. In this step, the non-functional requirements that must be met by the SOA shared services are determined. These non-functional requirements may be input to the SSDD and the SSNFRD. Next, SOA SLMP flow 170 analyzes and selects a service integration solution (SI-14 through SI-21). To accomplish this, analysis component 160 is configured to select an integration solution from a plurality of integration solutions, wherein the integration solution comprises a set of entities and a set of components associated with the set of candidate SOA shared services. Specifically, at SI-14, the high-level service scope is defined based on the service requirements and the non-functional service requirements. At SI-15, ownership of the SOA shared service is determined, and SOA SLMP flow 170 proceeds to SI-16, where the necessary service-specific resources are identified. At SI-17, SI-18, and SI-19, analysis component 160 performs a service-specific risk assessment, service-specific time analysis, and service-specific cost analysis, respectively. Based on these analyses, a service integration solution is selected at SI-20. To accomplish this, analysis component 160 is configured to select the set of SOA shared services from the set of candidate SOA shared services based on the integration solution, and enter it into the BS&R. If required, evidence may be created at SI-21 to provide support for (i.e., validate) the integration solution.

Figure 7:
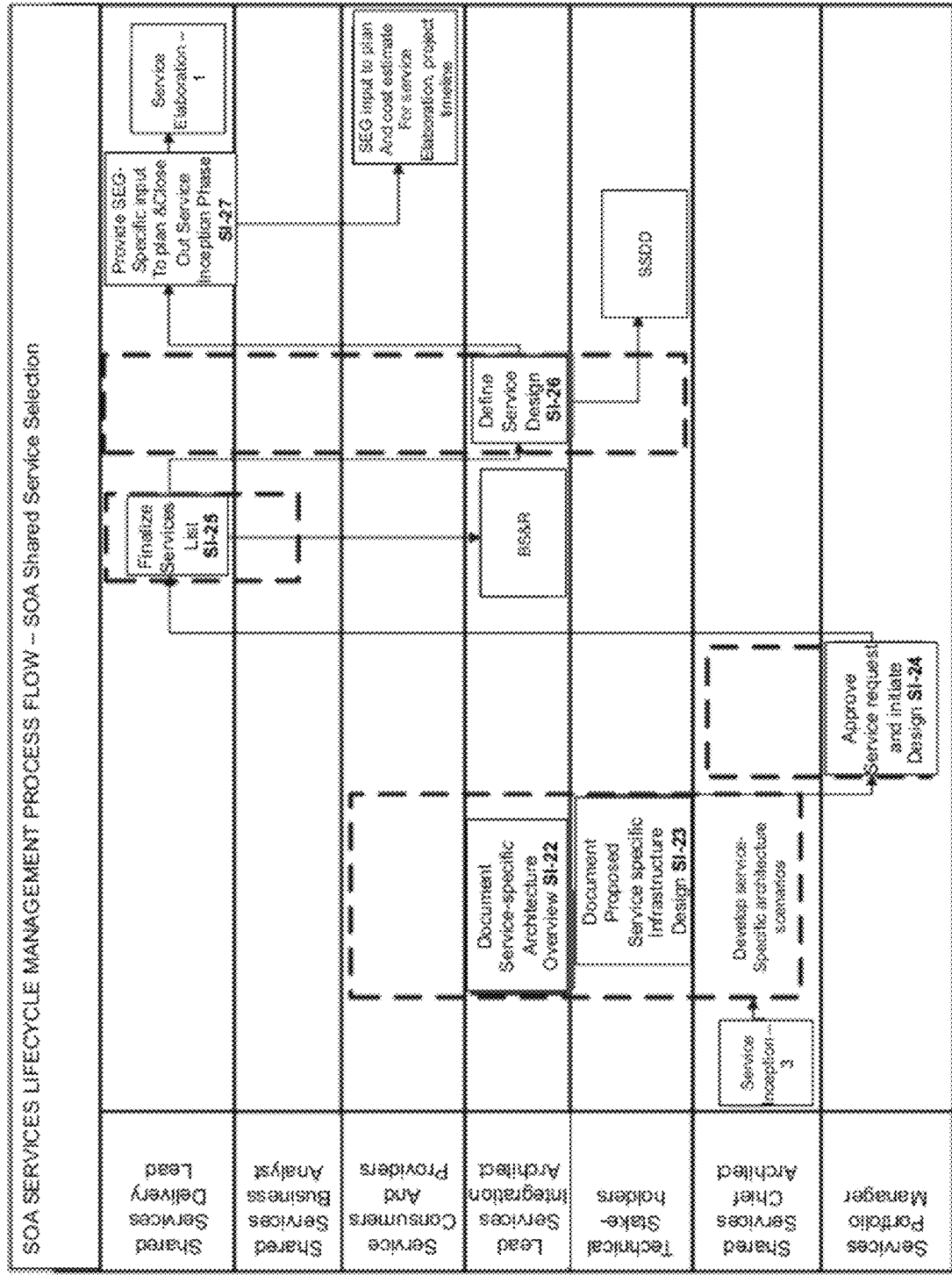
FIG. 7 shows a flow diagram of a SOA services lifecycle management process for selecting a SOA shared service.

Next, as shown in FIG. 7, SOA SLMP flow 170 proceeds to SI-22, where service-specific architecture scenarios are created. To accomplish this, service selection component 153 further comprises a design component 165 (FIG. 3) configured to develop a set of service specific architecture scenarios for the SOA shared service solution. In this step, design component 165 documents the architectural view (e.g., architectural view of systems involved), as well as the proposed infrastructure design of all environments for each potential architecture scenario. Next, at SI-23, the service-specific architecture scenarios are developed and documented. At SI-24, the service request is approved and the design is initiated. To accomplish this, design component 165 is configured to initiate a design for the set of candidate SOA shared services based on the set of service specific architecture scenarios.

Next, SOA SLMP flow 170 continues to SI-25, where a SOA shared services list is finalized. In this step, the final list of SOA shared services that are to be included in the SOA shared services project is determined. At SI-26, the SOA shared service design is defined. To accomplish this, design component 165 is configured to define a service design for each of the set of SOA shared services selected from the set of candidate SOA shared services. Specifically, design component defines various associations for each service including, the source and target for the business service(s), as well as the relationship between the two. For IT services, the associations are detailed in service registry 117. Design component 165 further defines who uses the SOA shared service and the entities affected by it, as well as all related dependencies. Finally at SI-27, the SOA enablement group is provided input to plan and close out the service inception phase of SLMP flow 130 (FIG. 2).

As shown, FIGS. 4-7 detail the organizational roles and responsibilities for each entity in SLMP flow 170. For example, SOA SLMP flow 170 identifies shared service roles indicating the primary and secondary (if applicable) roles for each entity (i.e., Shared Service Business Analyst, Lead Services Integration Architect, Services Registrar, etc.) at each process of the service construction phase. For example, at SI-3, Lead Services Integration Architect is considered to have primary responsibility for identifying candidate SOA shared services. All the other entities (i.e., the Shared Services Business Analyst) are considered to have secondary responsibility. This may mean that the Lead Services Integration Architect is given the ultimate authority and accountability to identify the candidate services. In this regard, SOA SLMP flow 170 governs the rules of engagement between the various entities. SOA SLMP flow 170 provides integration points between the various entities across different organizational domains involved in the development, deployment, transition, and management of SOA shared services, as discussed herein.

It will be appreciated that SOA SLMP flow 170 represents possible implementations of a process flow for selecting SOA shared services, and that other process flows are possible within the scope of the invention. SOA SLMP flow 170 illustrates the architecture, functionality, and operation of possible implementations of systems, methods and computer program products according to various embodiments of the present invention. In this regard, each portion of the flowchart may represent a module, segment, or portion of code, which comprises one or more executable instructions for implementing the specified logical function(s). It will also be noted that each block of flowchart illustration can be implemented by special purpose hardware-based systems that perform the specified functions or acts, or combinations of special purpose hardware and computer instructions.

Further, it can be appreciated that the methodologies disclosed herein can be used within a computer system to provide construction of a SOA shared service, as shown in FIG. 1. In this case, service selection tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Furthermore, an implementation of exemplary computer system 104 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for selecting a SOA shared service. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for selecting a service oriented architecture (SOA) shared service comprising the steps of:
   gathering service requirements of a SOA shared services project;
   identifying a set of candidate SOA shared services that meets the service requirements of the SOA shared services project;
   comparing the set of candidate SOA shared services to a set of technical and business requirements;
   determining non-functional requirements that must be met by the set of SOA shared services;
   determining functional requirements that must be met by the set of SOA shared services;
   defining a service scope based on the determined non-functional requirements and the determined functional requirements;
   selecting an integration solution based on at least one of a service-specific risk assessment, a service-specific time analysis, and a service-specific cost analysis; and
   based on the comparing, selecting a set of SOA shared services from the set of candidate SOA shared services for construction in accordance with the integration solution, the set of SOA shared services meeting the defined service scope;
   wherein shared service roles are defined for each of various entities at each step of the selection method.

2. The method according to claim 1, further comprising:
   developing a set of service specific architecture scenarios for the integration solution; and
   initiating a design for the set of candidate SOA shared services based on the set of service specific architecture scenarios for the integration solution.

3. The method according to claim 2, the selecting comprising:
   selecting the integration solution from a plurality of integration solutions, wherein the integration solution comprises a set of entities and a set of components associated with the set of candidate SOA shared services; and
   selecting the set of SOA shared services from the set of candidate SOA shared services based on the integration solution.

4. The method according to claim 1, further comprising defining a service design for each of the set of SOA shared services selected from the set of candidate SOA shared services.

5. The method according to claim 1, the identifying further comprising searching within a services registry for existing SOA shared services that can be re-used.

6. A system for selecting a service oriented architecture (SOA) shared service comprising:
   at least one processing unit;
   memory operably associated with the at least one processing unit; and
   a service selection tool storable in memory and executable by the at least one processing unit, the service selection tool comprising:
      an input component configured to gather service requirements of a SOA shared services project;
      an identification component configured to identify a set of candidate SOA shared services that meets the service requirements of the SOA shared services project; and
      an analysis component configured to:
         compare the set of candidate SOA shared services to a set of technical and business requirements;
         determine non-functional requirements that must be met by the set of SOA shared services;
         determine functional requirements that must be met by the set of SOA shared services;
         define a service scope based on the determined non-functional requirements and the determined functional requirements;
         select an integration solution based on at least one of a service-specific risk assessment, a service-specific time analysis, and a service-specific cost analysis; and
         based on the comparing, select a set of SOA shared services from the set of candidate SOA shared services for construction in accordance with the integration solution, the set of SOA shared services meeting the defined service scope;
      wherein shared service roles are defined for each of various entities administering each component of the system according to a set of rules of engagement.

7. The service selection tool according to claim 6 further comprising a design component configured to:
   develop a set of service specific architecture scenarios for the integration solution; and
   initiate a design for the set of candidate SOA shared services based on the set of service specific architecture scenarios for the integration solution.

8. The service selection tool according to claim 7, the design component further configured to define a service design for each of the set of SOA shared services selected from the set of candidate SOA shared services.

9. The service selection tool according to claim 7, the analysis component further configured to:
   select the integration solution from a plurality of integration solutions, wherein the integration solution comprises a set of entities and a set of components associated with the set of candidate SOA shared services; and
   select the set of SOA shared services from the set of candidate SOA shared services based on the integration solution.

10. The service selection tool according to claim 6, the identification component further configured to search within a services registry for existing SOA shared services that can be re-used.

11. A non-transitory computer-readable medium storing computer instructions, which when executed, enables a computer system to select a service oriented architecture (SOA) shared service, the computer instructions comprising:
gathering service requirements of a SOA shared services project;
identifying a set of candidate SOA shared services that meets the service requirements of the SOA shared services project;
comparing the set of candidate SOA shared services to a set of technical and business requirements; and
determining non-functional requirements that must be met by the set of SOA shared services;
determining functional requirements that must be met by the set of SOA shared services;
defining a service scope based on the determined non-functional requirements and the determined functional requirements;
selecting an integration solution based on at least one of a server-specific risk assessment, a service-specific time analysis, and a service-specific cost analysis; and
based on the comparing, selecting a set of SOA shared services from the set of candidate SOA shared services for construction in accordance with the integration solution, the set of SOA shared services meeting the defined service scope;
wherein shared service roles are defined for each of various entities at each step according to a set of rules of engagement.

12. The computer-readable medium according to claim 11, the computer instructions further comprising:
developing a set of service specific architecture scenarios for the integration solution; and
initiating a design for the set of candidate SOA shared services based on the set of service specific architecture scenarios for the integration solution.

13. The computer-readable medium according to claim 12, the computer instructions for selecting further comprising:
selecting the integration solution from a plurality of integration solutions, wherein the integration solution comprises a set of entities and a set of components associated with the set of candidate SOA shared services; and
selecting the set of SOA shared services from the set of candidate SOA shared services based on the integration solution.

14. The computer-readable medium according to claim 11, the computer instructions further comprising defining a service design for each of the set of SOA shared services selected from the set of candidate SOA shared services.

15. The computer readable medium according to claim 11, the computer instructions for identifying further comprising searching within a services registry for existing SOA shared services that can be re-used.

16. A method for deploying a service selection tool for use in a computer system that provides selection of a service oriented architecture (SOA) shared service, comprising:
providing a computer infrastructure operable to perform the steps:
gather service requirements of a SOA shared services project;
identify a set of candidate SOA shared services that meets the service requirements of the SOA shared services project;
compare the set of candidate SOA shared services to a set of technical and business requirements;
determine non-functional requirements that must be met by the set of SOA shared services;
determine functional requirements that must be met by the set of SOA shared services;
define a service scope based on the determined non-functional requirements and the determined functional requirements; an 4
selecting an integration solution based on at least one of a server-specific risk assessment, a service-specific time analysis, and a service-specific cost analysis; and
based on the comparing, select a set of SOA shared services from the set of candidate SOA shared services for construction in accordance with the integration solution, the set of SOA shared services meeting the defined service scope;
wherein shared service roles are defined for each of various entities at each step according to a set of rules of engagement.

17. The method according to claim 16, the computer infrastructure further operable to:
develop a set of service specific architecture scenarios for the integration solution; and
initiate a design for the set of candidate SOA shared services based on the set of service specific architecture scenarios for the integration solution.

18. The method according to claim 17, the computer infrastructure operable to select further operable to:
select the integration solution from a plurality of integration solutions, wherein the integration solution comprises a set of entities and a set of components associated with the set of candidate SOA shared services; and
select the set of SOA shared services from the set of candidate SOA shared services based on a selected integration solution.

19. The method according to claim 16, the computer infrastructure further operable to define a service design for each of the set of SOA shared services selected from the set of candidate SOA shared services.

20. The method according to claim 16, the computer infrastructure operable to identify further operable to search within a services registry for existing SOA shared services that can be re-used.

* * * * *